(12) United States Patent
Song

(10) Patent No.: US 12,388,144 B2
(45) Date of Patent: Aug. 12, 2025

(54) BATTERY LOAD SUPPORT STRUCTURE OF FUSELAGE

(71) Applicants: Hyundai Motor Company, Seoul (KR); Kia Corporation, Seoul (KR)

(72) Inventor: Won Ki Song, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/370,187

(22) Filed: Sep. 19, 2023

(65) Prior Publication Data

US 2024/0322337 A1 Sep. 26, 2024

(30) Foreign Application Priority Data

Mar. 20, 2023 (KR) .................. 10-2023-0035572

(51) Int. Cl.
*H01M 50/249* (2021.01)
*B64C 1/06* (2006.01)
*B64C 1/10* (2006.01)
*H01M 50/242* (2021.01)
*H01M 50/264* (2021.01)

(52) U.S. Cl.
CPC .......... *H01M 50/249* (2021.01); *B64C 1/062* (2013.01); *H01M 50/242* (2021.01); *H01M 50/264* (2021.01); *B64C 1/10* (2013.01); *H01M 2220/20* (2013.01)

(58) Field of Classification Search
CPC ...... B64D 27/357; B64D 27/02; B64D 27/24; H01M 50/20–264; B60K 1/04; B60K 2001/0438; B60K 2001/0405
See application file for complete search history.

(56) References Cited

U.S. PATENT DOCUMENTS

| | | | | |
|---|---|---|---|---|
| 4,815,678 | A | * 3/1989 | Gawne | B64C 25/00 244/100 R |
| 2015/0183505 | A1 | * 7/2015 | Fink | B64C 1/06 244/119 |
| 2019/0252744 | A1 | * 8/2019 | Zimmermann | B64D 27/24 |
| 2022/0255159 | A1 | 8/2022 | Amante et al. | |

FOREIGN PATENT DOCUMENTS

| | | |
|---|---|---|
| CN | 211996172 U | 11/2020 |
| JP | 5558588 B2 | 7/2014 |
| KR | 101878681 B1 | 8/2018 |
| KR | 102153029 B1 | 9/2020 |
| KR | 2021-0037904 A | 4/2021 |
| KR | 102344152 B1 | 1/2022 |

* cited by examiner

*Primary Examiner* — Ashesh Dangol
(74) *Attorney, Agent, or Firm* — Banner & Witcoff, Ltd.

(57) ABSTRACT

The present disclosure provides a battery load support structure of a fuselage, the battery load support structure including a battery mount support formed in a longitudinal direction of a floor frame of the fuselage, a battery unit inputted into an opened lower side of the floor frame and fastened to the battery mount support, and a joint unit configured to support the battery mount support and connected to a plurality of framework members that constitutes the floor frame.

11 Claims, 16 Drawing Sheets

[Section A-A]

[Section B-B]

[Section D-D]

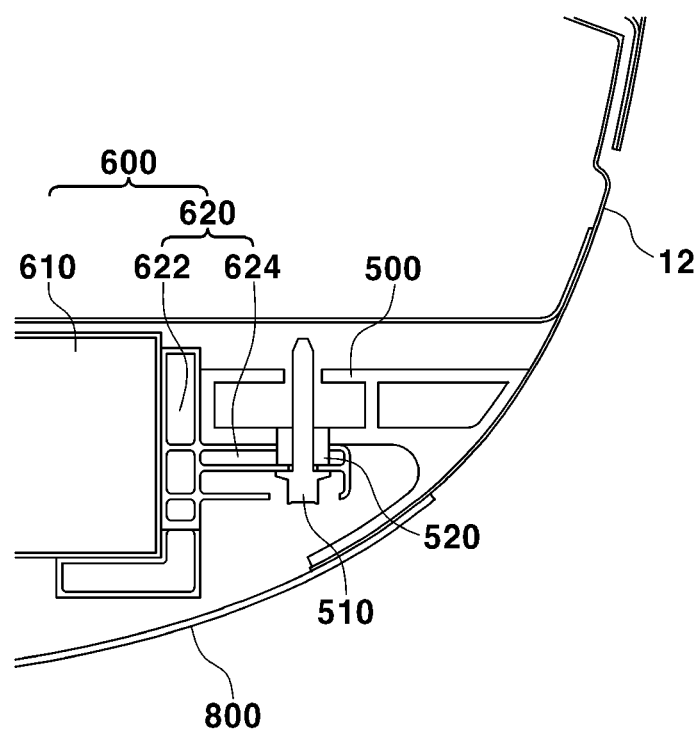

BATTERY LOAD SUPPORT STRUCTURE OF FUSELAGE

CROSS-REFERENCE TO RELATED APPLICATION

This application claims under 35 U.S.C. § 119(a) the benefit of Korean Patent Application No. 10-2023-0035572 filed on Mar. 20, 2023, the entire contents of which are incorporated herein by reference.

BACKGROUND

(a) Technical Field

The present disclosure relates to a battery load support structure of a fuselage, and more particularly, to a battery load support structure of a fuselage, which is capable of improving load supporting performance of a battery mount support.

(b) Discussion of the Background

Urban air mobility (UAM) vehicles have been developed as air transportation systems for addressing traffic congestion on roads.

Urban air mobility vehicles are to provide transportation services capable of safely transporting occupants to designated locations. Urban air mobility vehicles may not require a separate runway because urban air mobility vehicles may take off and land vertically. Urban air mobility vehicles may not require a pilot because urban air mobility vehicles may autonomously operate. Therefore, urban air mobility vehicles may be used at low costs in comparison with a helicopter.

Because the occupant is positioned close to an interior of a fuselage of the urban air mobility vehicle, a technology for ensuring stability in the event of a collision may be most important.

However, some urban air mobility vehicles may have a problem in that safety cannot be ensured because a large amount of collision load is applied to a space, in which the occupant is located, by impact applied to the fuselage in the event of a collision.

The above information disclosed in this Background section is only for enhancement of understanding of the background of the disclosure and therefore it may contain information that does not form the prior art that is already known to a person of ordinary skill in the art.

SUMMARY OF THE DISCLOSURE

The following summary presents a simplified summary of certain features. The summary is not an extensive overview and is not intended to identify key or critical elements.

An object of the present disclosure is to provide a battery load support structure of a fuselage, in which a battery mount support is mounted on a floor frame, and a battery unit is fastened to the battery mount support extending in a longitudinal direction, such that the battery unit may be coupled from below the fuselage, and a joint unit is coupled to a plurality of positions at which the battery mount support adjoins a front bulkhead, a center bulkhead, and a rear bulkhead that constitute the fuselage, such that structural reinforcement is implemented, thereby improving load supporting performance of the battery mount support.

A structure may comprise: a battery mount support formed on a floor frame of a fuselage; a battery unit inputted into an opened lower side of the floor frame and fastened to the battery mount support; and a joint unit configured to support the battery mount support and connected to a plurality of framework members that constitutes the floor frame.

The joint unit may comprise: a front joint mounted at a position at which the battery mount support faces a front bulkhead that constitutes at least one of the plurality of framework members; a first center joint mounted on the battery mount support and configured to accommodate therein a first center bulkhead that constitutes at least one of the plurality of framework members; a second center joint formed as a second center bulkhead that constitutes at least one of the plurality of framework members, wherein the second center bulkhead is connected to a connection frame, and wherein the connection frame is configured to support the battery mount support and a passenger space of the fuselage; and a rear joint coupled to a rear bulkhead that constitutes at least one of the plurality of framework members.

The front joint may be provided as a skid mounting bracket for fastening a front skid member mounted on the opened lower side of the floor frame.

The second center joint may be formed in a hemispherical shape corresponding to a shape of a lower portion of the fuselage and formed as the battery mount support and the connection frame are respectively flange-coupled to front and rear surfaces.

The battery mount support may have a coupling guide extending to correspond to a shape of a coupling flange of the second center joint.

The battery unit may comprise: a battery configured to supply electric power for operating the fuselage; and a battery support extending to two opposite sides of the battery and coupled to the battery mount support.

The battery support may be fixed to the battery from the floor frame by a nut and a fastening member, and wherein the fastening member penetrate the battery mount support.

The structure may further comprise: a fuselage lower panel configured to constitute a bottom surface of the fuselage by being coupled to a side panel of the fuselage in a state in which the battery unit is coupled to the battery mount support.

Other aspects of the present disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

These and other features and advantages are described in greater detail below.

BRIEF DESCRIPTION OF THE DRAWINGS

The above and other features of the present disclosure will now be described in detail with reference to various examples thereof illustrated in the accompanying drawings which are given hereinbelow by way of illustration only, and thus are not limitative of the present disclosure, and wherein:

FIGS. 15A and 15B are views illustrating a fastening member and a fuselage lower panel with respect to the battery load dispersion structure of the fuselage.

Figure 1:
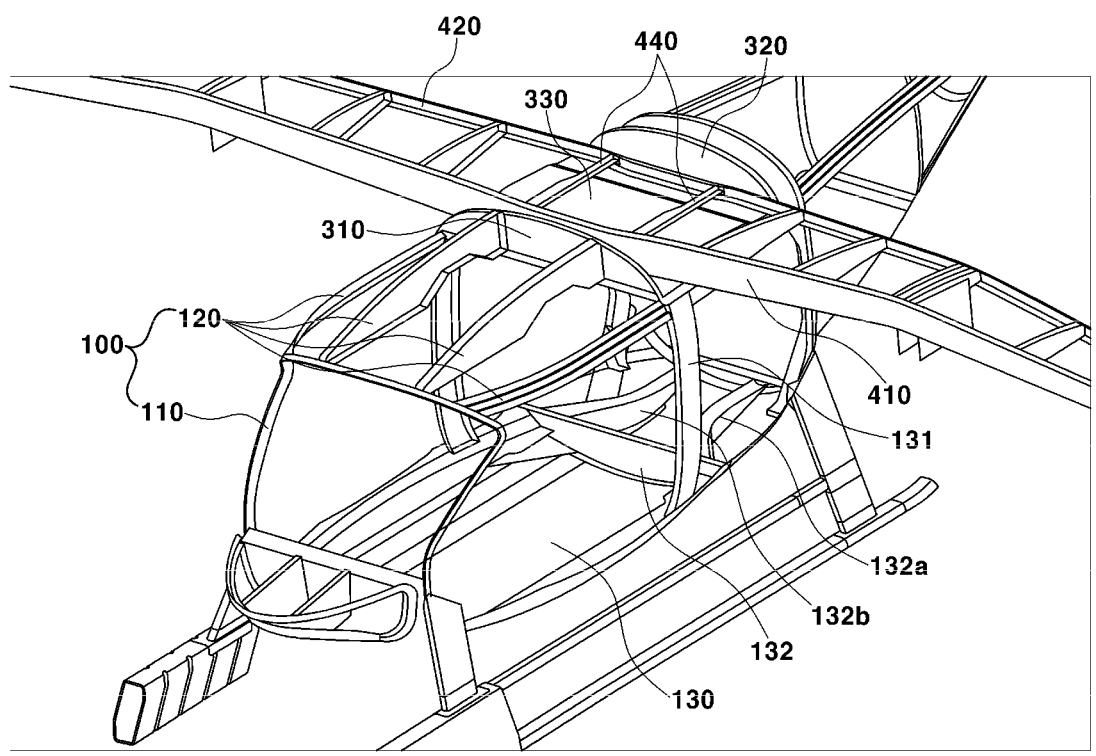
FIG. 1 is a view illustrating a collision load dispersion structure of a fuselage.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various examples of the present disclosure, examples of which are illustrated in the accompanying drawings and described below. While the present disclosure will be described in conjunction with certain examples, it will be understood that present description is not intended to limit the scope of the disclosure to those examples. It should be understood that various alternatives, modifications, equivalents and other examples are also within the scope of the present disclosure.

Hereinafter, various examples of the present disclosure will be described in more detail with reference to the accompanying drawings. The features described herein may be modified in various different forms, and it is not interpreted that the scope of the present disclosure is limited to such exemplary features.

In addition, the term "part," "unit," "member," or the like, which is described in the specification, may refer to a unit that performs at least one function or operation, and the "part," "unit," "member," or the like may be implemented by software and/or hardware.

In addition, when one constituent element disclosed in the specification is referred to as being "connected to" another constituent element, one constituent element can be "directly connected to" the other constituent element, and one constituent element can also be "indirectly connected to" the other constituent element. The indirect connection includes a connection through a wireless communication network.

In addition, the term "upper end" disclosed in the specification may refer to a direction of an upward movement in a height direction in the drawings, and the term "lower end" may refer to a direction of a downward movement in the height direction in the drawings.

In addition, in the present specification, when one component is described as being positioned "on" or "above" another component, one component can be positioned "directly on" or "directly above" another component, and one component can also be positioned on another component with other components interposed therebetween. In addition, when one component is described as being positioned "under" or "below" another component, one component can be positioned "directly under" or "directly below" another component, and one component can also be positioned on another component with other components interposed therebetween.

In addition, in the present specification, the terms "height direction," "width direction," and "longitudinal direction" are defined on the basis of a fuselage.

In addition, the term "fuselage" disclosed in the specification may be an urban air mobility (UAM) vehicle. The present specification describes a case in which a frontal collision occurs as the urban air mobility vehicle crashes.

In addition, the term "center" disclosed in the specification may refer to a center based on a width direction of the fuselage, and the term "sides" may refer to two opposite ends based on the width direction of the fuselage.

Figure 2:
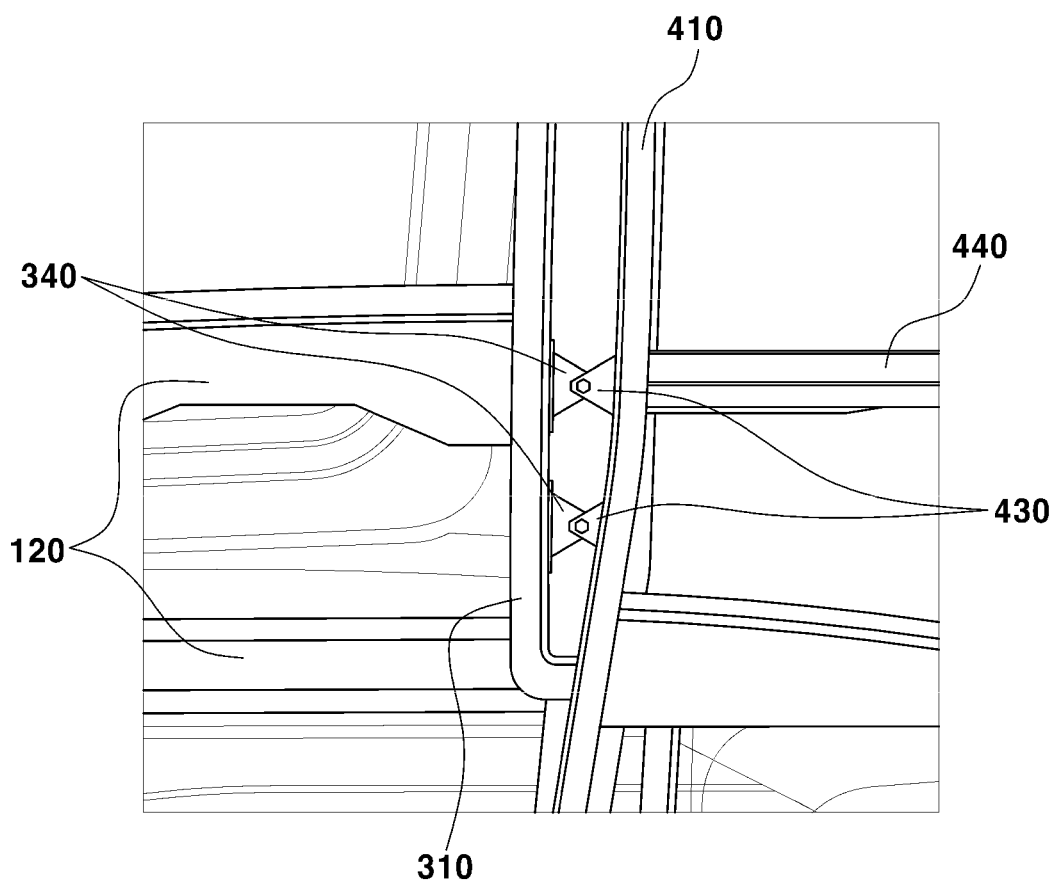
FIG. 2 is a view illustrating a fastening relationship of a support fitting member and a wing fitting member to the collision load dispersion structure of the fuselage.

FIG. 1 is a perspective view illustrating a collision load dispersion structure of a fuselage, and FIG. 2 is a perspective side view illustrating the collision load dispersion structure of the fuselage and illustrating a fastening relationship between a support fitting member and a wing fitting member.

The fuselage may include fuselage of aircrafts capable of not only taking off and landing vertically but also flying within a medium range and may be defined as advanced air mobility (AAM) to include all of manned/unmanned aircrafts and autonomous or human-driven aircrafts. Because the fuselage may have a structure similar to a typical aircraft structure, a collision load may be generated in the same direction when the fuselage takes off or lands vertically or takes off from or lands on a runway. Therefore, it is important to ensure that the fuselage needs to absorb collision energy at front and rear sides of the fuselage, and thus deformation of an occupant compartment needs to be reduced.

Figure 3:
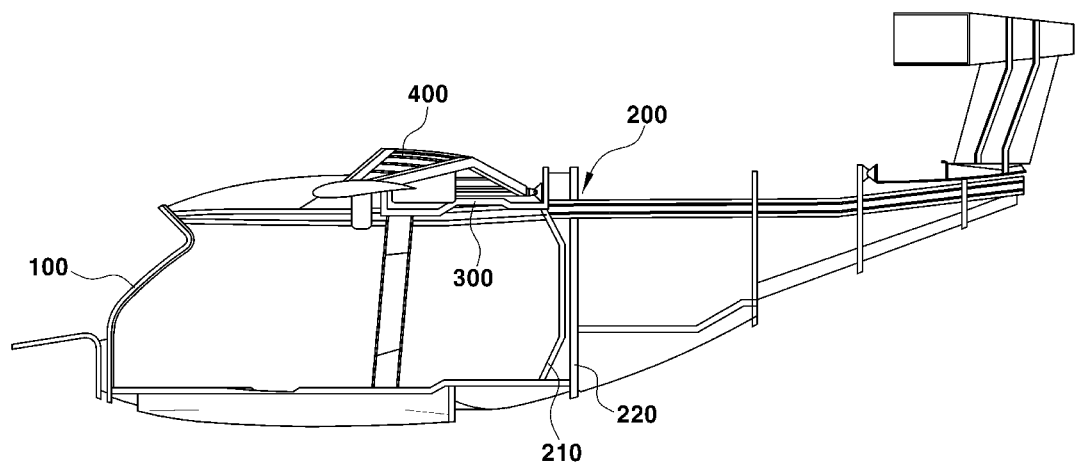
FIG. 3 is a view illustrating a rear unit with respect to the collision load dispersion structure of the fuselage.

To this end, with reference to FIGS. 1, 2, and 3, the collision load dispersion structure of the fuselage may include a support unit 300 disposed between a front unit 100 and a rear unit 200 and connected to a wing unit 400. The collision load dispersion structure may be configured to disperse a load, which may be applied to the fuselage, toward a rear side of the wing unit 400 and a rear side of the fuselage. For example, a longitudinal load and a height direction load, which may be applied to the fuselage, may be transferred through a connection structure between the front unit 100 and the support unit 300, a connection structure between the support unit 300 and the rear unit 200, and a connection structure between the support unit 300 and the wing unit 400, thereby reducing a collision load to be applied to a space in which an occupant is present.

The front unit 100 may be positioned at a front end based on a wing of the fuselage. The front unit 100 may include a window frame 110 on which a windshield glass may be mounted, and roof frames 120. The roof frame 120 may be connected to a rear end of the window frame 110 and extend in a longitudinal direction (e.g., from the front unit 100 to the wing unit 400 or from the wing unit 400 to the front unit 100) of the fuselage. The window frame 110 may be a frame that surrounds the windshield glass on the front surface of the fuselage. The roof frames 120 may be fastened to an upper end of the window frame 110. The plurality of roof frames 120 may be spaced apart from one another in a width direction of the window frame 110. As illustrated in FIG. 1, two roof frames 120 may be provided at a center based on the width direction of the window frame 110, and two roof frames 120 may be provided at sides based on the width direction of the window frame 110. The four roof frames 120 may be provided at equal intervals. A floor frame 130 may define a fuselage floor. An interior space in the front unit 100 may be divided into a first-row passenger space at a front side and a second-row passenger space at a rear side. The floor frame 130 may be divided into the first-row passenger space and the second-row passenger space based on a rear bulkhead 132. The rear bulkhead 132 may include a pair of connection frames 132a and 132b connected to a second rear frame 220 to be described below.

The support unit 300 may be positioned between the front unit 100 and the rear unit 200. The roof frame 120 may be connected to the support unit 300. In an example, a rear end of the roof frame 120 may be connected to a front end of the support unit 300. The support unit 300 may be connected to the front unit 100 and the rear unit 200 and configured to disperse rearward a load applied to a front side of the fuselage. In an example, the support unit 300 may include a first flange part 310, a second flange part 320, a plate part 330, and support fitting members 340.

The support unit 300 may be configured such that the first flange part 310 and the second flange part 320 face each other with respect to the plate part 330. An interior of the support unit 300 may include a space in which the first flange part 310 and the second flange part 320 are fastened while facing each other. The first flange part 310 may be connected to the rear end of the roof frame 120. In an example, the rear end of the roof frame 120 may be fastened to a front outer surface of the first flange part 310. The second flange part 320 may be connected to a front end of the rear unit 200. In an example, the front end of the rear unit 200 may be fastened to a rear outer surface of the second flange part 320.

The plate part 330 may be provided between the first flange part 310 and the second flange part 320. In an example, the plate part 330 may define a rear surface of a recessed region between the first flange part 310 and the second flange part 320 positioned at two opposite surfaces based on the longitudinal direction. The plate part 330 may be formed in a plate shape and provided between a lower end of the first flange part 310 and a lower end of the second flange part 320. The plate part 330 may be connected to a member, which defines an external framework of the fuselage, and configured to transfer a longitudinal load and a height direction load of the fuselage.

The support fitting members 340 may be provided at two opposite inner surfaces of the first flange part 310 and two opposite inner surfaces of the second flange part 320. In an example, the support fitting members 340 may be provided inside the first flange part 310 and fastened to wing fitting members 430 disposed at positions corresponding to longitudinal ends of wing frame parts 440. In an example, as illustrated in FIG. 2, two support fitting members 340 may be provided at each of left and right sides based on the width direction and disposed inside the first flange part 310 when it is necessary to reinforce a connection structure between a first flange 310 and a first framework part 410. Two support fitting members 340 may be provided at each of left and right sides based on the width direction and disposed inside the second flange part 320. One end of each of the support fitting members 340 may be provided at a position corresponding to the inside of each of the first flange part 310 and the second flange part 320. Coupling parts may be provided at the other end of the first flange part 310 and the other end of the second flange part 320, which correspond to two opposite ends of the support fitting members 340, and fastened to the wing fitting member 430.

The wing unit 400 may be positioned inside the support unit 300. The wing unit 400 may be connected to the support unit 300 and configured to disperse a load along the wing unit 400 when the load is generated in the event of a collision of the fuselage. The wing unit 400 may include the first framework part 410, a second framework part 420, the wing fitting member 430, the wing frame parts 440, and a skin part 450. The first framework part 410 may be spaced apart from an inner side of the first flange part 310 at a predetermined interval and extend in the width direction of the fuselage. The second framework part 420 may be spaced apart from an inner side of the second flange part 320 at a predetermined interval and extend in the width direction of the fuselage. The first framework part 410 may define a transverse framework at a front end of the wing unit 400, and the second framework part 420 may define a transverse framework at a rear end of the wing unit 400.

The wing fitting members 430 may be positioned at positions corresponding to the longitudinal direction of the support fitting members 340 and provided at an outer side of the first framework part 410 and an outer side of the second framework part 420. The outer side of the first framework part 410 at which the wing fitting member 430 is positioned may mean a direction in which the first framework part 410 faces the first flange part 310. The outer side of the second framework part 420 at which the wing fitting member 430 is positioned may mean a direction in which the second framework part 420 faces the second flange part 320.

The wing fitting members 430 may be connected to the support fitting members 340. In an example, two wing fitting members 430 may be provided at each of left and right sides based on the width direction and disposed outside the first framework part 410. Two wing fitting members 430 may be provided at each of left and right sides based on the width direction and disposed outside the second framework part 420. One end of each of the wing fitting members 430 may be fixed to the outer side of each of the first framework part 410 and the second framework part 420, and a coupling part may be provided at the other end of each of the first framework part 410 and the second framework part 420. The coupling part of the support fitting member 340 and the coupling part of the wing fitting member 430 may be fastened to each other, and the wing unit 400 may be fixed to the support unit 300.

The wing frame part 440 may be provided between the first framework part 410 and the second framework part 420. The wing fitting member 430 may be provided at a position corresponding to one longitudinal end of the wing frame part 440. In an example, as illustrated in FIG. 1, two wing frame parts 440 may be provided between the first framework part 410 and the second framework part 420 positioned above the plate part 330. The wing frame parts 440 may be positioned between the first framework part 410 and the second framework part 420 and configured to transfer a load applied to the first framework part 410 and a load applied to the second framework part 420. As illustrated in FIG. 2, the wing fitting members 430 and the support fitting members 340 may be fastened so that the wing frame parts 440 are positioned on the same lines as the roof frames 120 facing one another, such that the wing frame parts 440 may transfer the load applied to the first framework part 410 and the load applied to the second framework part 420.

The skin part 450 (see e.g., FIG. 5) may surround an outer side of the first framework part 410 and an outer side of the second framework part 420. The skin part 450 may be positioned while adjoining an upper surface of the first framework part 410 and an upper surface of the second framework part 420. As described above, the skin part 450, which may be positioned while adjoining the first framework part 410 and the second framework part 420, may be configured to disperse a load applied to the first framework part 410 and a load applied to the second framework part 420 in the longitudinal direction or the width direction of the wing unit 400. The longitudinal load (e.g., the load applied along the longitudinal direction) of the fuselage may be dispersed to the wing unit 400 through the support unit 300 via the front unit 100.

Figure 4:
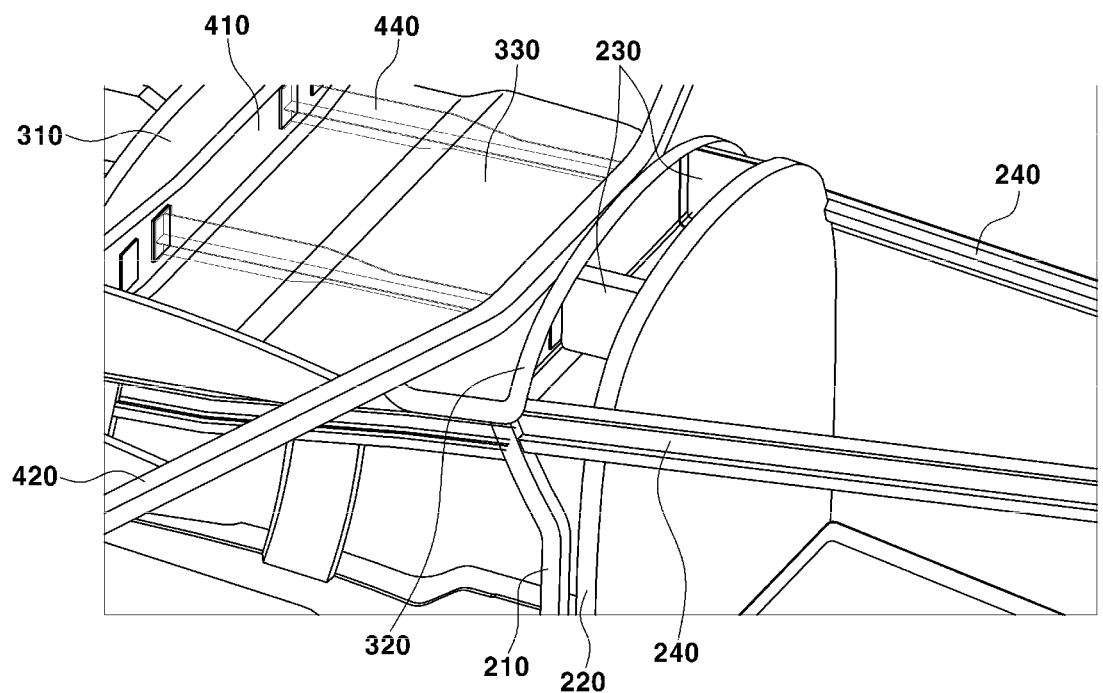
FIG. 4 is a view illustrating a connection relationship of a wing unit and the rear unit to the collision load dispersion structure of the fuselage.

FIG. 3 illustrates the rear unit of the collision load dispersion structure of the fuselage, and FIG. 4 illustrates a connection relationship between the rear unit and the wing unit 400 of the collision load dispersion structure of the fuselage.

With reference to FIGS. 3 and 4, the rear unit 200 may be positioned at a rear end based on the wing of the fuselage. The rear unit 200 may include a first rear frame 210, the second rear frame 220, rear center frames 230, and rear side frames 240. The first rear frame 210 may be connected to the plate part 330. In an example, the first rear frame 210 may extend in a height direction along an outer side of the fuselage and be fastened to a lower end of the second flange part 320 from the fuselage floor. In an example, an upper end of the first rear frame 210 may be positioned while adjoining the lower end of the second flange part 320.

The second rear frame 220 may be positioned at a rear end of the first rear frame 210. The second rear frame 220 may be formed in a plate shape and disposed adjacent to the rear end of the first rear frame 210. The second rear frame 220 may be fastened to the pair of connection frames 132a and 132b connected to the rear bulkhead 132. The second rear frame 220 may be positioned to have a predetermined interval based on the upper end of the first rear frame 210, for example, an interval corresponding to a length of the rear center frame 230 in FIG. 4, such that the second rear frame 220 may be configured to transmit a load, which may be applied from a lower end of the fuselage, to an upper end of the fuselage in the height direction.

The rear center frame 230 may be positioned between the second flange part 320 and the second rear frame 220. The rear center frames 230 may be disposed in a space in which the second flange part 320 and the second rear frame 220 face each other. In an example, two rear center frames 230 may be provided at positions corresponding to the positions of the wing frame parts 440 in the longitudinal direction.

The rear side frame 240 may be positioned while adjoining the first rear frame 210 and the second rear frame 220. The rear side frame 240 may be connected to the upper end of the first rear frame 210 and an upper end of the second rear frame 220. The rear side frame 240 may extend rearward in the longitudinal direction of the fuselage. One end of the rear side frame 240 may be connected to the first rear frame, and the other end of the rear side frame 240 may extend toward the rear side of the fuselage.

Figure 5:
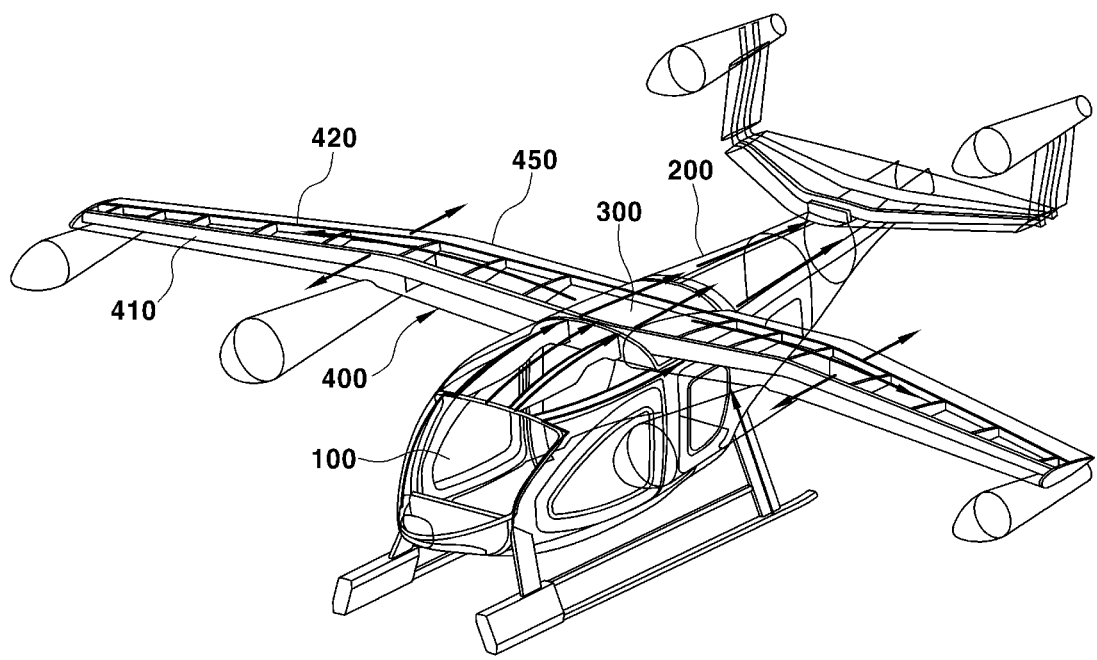
FIG. 5 is a view illustrating a state in which a longitudinal load and a height direction load are dispersed toward a rear side of the wing unit and a rear side of the fuselage with respect to the collision load dispersion structure of the fuselage.

FIG. 5 is a view illustrating a state in which the longitudinal load and the height direction load of the collision load dispersion structure of the fuselage are dispersed toward the rear side of the wing unit 400 and the rear side of the fuselage.

With reference to FIG. 5, the longitudinal load of the fuselage may be transferred to the first flange part 310 (see e.g., FIG. 6) through the window frame 110 and the roof frame 120, transferred to the first framework part 410 through the support fitting member 340 (see e.g., FIG. 2) and the wing fitting member 430, and dispersed through the skin part 450. The load transferred to the first framework part 410 may be transferred to the second framework part 420 (see e.g., FIG. 1) through the wing frame part 440 and dispersed through the skin part 450.

In an example, in case that the fuselage crashes and a collision load is applied at a predetermined angle with respect to a front end of the fuselage, the longitudinal load may be applied to the window frame 110 and transferred to a front end of the roof frame 120 connected to a rear end of the window frame 110. The load transferred to the rear end of the roof frame 120 may be transferred to the first flange part 310 and transferred to the support fitting member 340 and the wing fitting member 430. The load transferred to the support fitting member 340 and the wing fitting member 430 may be transferred to the first framework part 410 and dispersed in the longitudinal direction of the first framework part 410. The load, which is dispersed in the longitudinal direction of the first framework part 410, may also be dispersed in the longitudinal direction of the fuselage through the skin part 450. The load transferred to the first framework part 410 may be transferred to the second framework part 420 through the wing frame part 440 and dispersed in the longitudinal direction of the second framework part 420. The load, which is dispersed in the longitudinal direction of the second framework part 420, may also be dispersed in the longitudinal direction of the fuselage through the skin part 450.

The height direction load (e.g., the load applied along the height direction) of the fuselage may be transferred to the second flange part 320 (see e.g., FIG. 4) through the first rear frame 210, transferred to the rear side frame 240 and the rear center frame 230 of the rear unit 400 through the second rear frame 220, transferred to the second framework part 420 through the support fitting member 340 and the wing fitting member 430, and dispersed through the skin part 450. The load transferred to the second framework part 420 may be transferred to the first framework part 410 through the wing frame part 440 and dispersed through the entire region of the fuselage.

In an example, in case that a height direction collision load (e.g., the collision load applied along the height direction) of the fuselage is applied, the height direction load transferred to the fuselage may be applied to a lower end of the first rear frame 210 and transferred to the second flange part 320 connected to the upper end of the first rear frame 210. A part of the height direction load applied to the fuselage may be applied to a lower end of the second rear frame 220 and transferred to the rear side frame 240 connected to the upper end of the second rear frame 220. The collision load applied to the second rear frame 220 may be transferred to the second flange part 320 and transferred to the wing fitting member 430 through the support fitting member 340 fastened to the second flange part 320. The load transferred to the support fitting member 340 and the wing fitting member 430 may be transferred to the second framework part 420 and dispersed in the longitudinal direction of the second framework part 420. The load, which is dispersed in the longitudinal direction of the second framework part 420, may also be dispersed in the longitudinal direction of the fuselage through the skin part 450. The load transferred to the second framework part 420 may be transferred to the first framework part 410 through the wing frame part 440 and dispersed in the longitudinal direction of the first framework part 410. The load, which is dispersed in the longitudinal direction of the first framework part 410, may also be dispersed in the longitudinal direction of the fuselage through the skin part 450. Therefore, the height direction load of the fuselage may be dispersed to the wing unit 400 through the support unit 300 via the rear unit 200.

Figure 6:
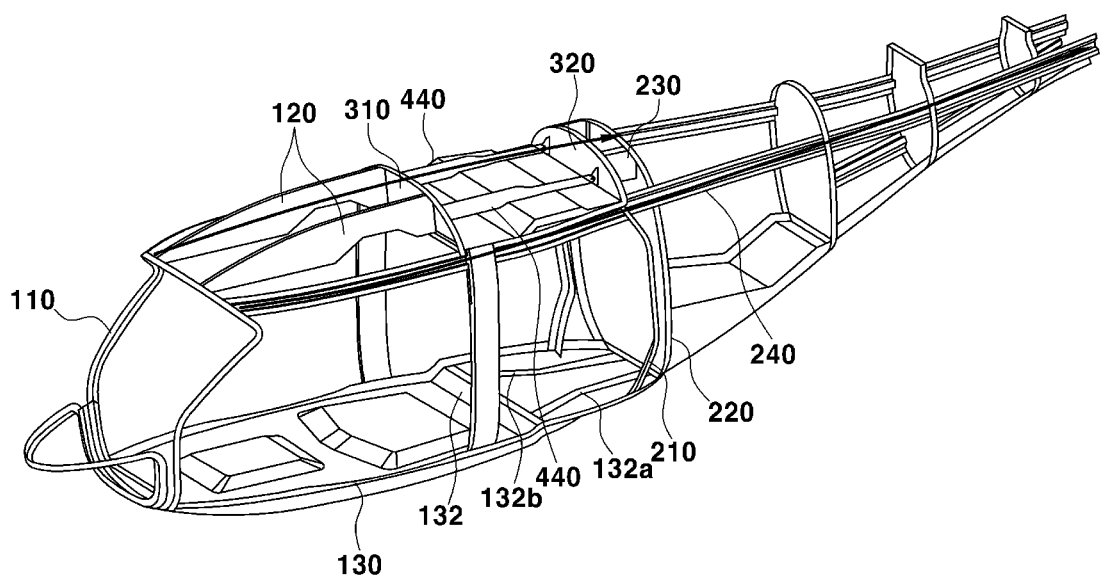
FIG. 6 is a view illustrating a state in which a longitudinal center load and a side load are transmitted with respect to the collision load dispersion structure of the fuselage.

FIG. 6 illustrates a state in which a longitudinal center load and a side load of the collision load dispersion structure of the fuselage are transferred.

With reference to FIG. 6, the load applied in the longitudinal direction of the fuselage may be transferred to the wing frame part 440 from the roof frame 120 through the first flange part 310 and transferred to the rear center frame 230 from the wing frame part 440 through the second flange part 320. The longitudinal direction side load of the fuselage may be transferred to the rear side frames 240 through the first rear frame 210 along a lateral side of the plate part 330 from the roof frames 120 at the two opposite ends at the front side.

In an example, the load applied in the longitudinal direction of the fuselage may be transferred from the front end to the rear end of the roof frame 120 and transferred to the support fitting member 340 and the wing fitting member 430 disposed adjacent to the first flange part 310 through the first flange part 310. The load, which is transferred to the support fitting member 340 and the wing fitting member 430 disposed adjacent to the first flange part 310, may be transferred to the wing frame part 440 and transferred to the support fitting member 340 and the wing fitting member 430 disposed adjacent to the second flange part 320. The load, which is transferred to the support fitting member 340 and the wing fitting member 430 disposed adjacent to the second flange part 320, may be transferred to the second flange part 320 and transferred to the rear center frame 230.

A load, which is transmitted to a lateral side among the longitudinal loads of the fuselage, may be transferred from the front end to the rear end of the fuselage along the two opposite ends of the roof frame 120 and transferred to the rear surface of the fuselage in the longitudinal direction of the plate part 330. The load transferred to the rear end of the plate part 330 may be transferred to the rear side frame 240 through the first rear frame 210.

In at least some implementations, one or more features and/or structures described in the present disclosure may provide the collision load dispersion structure of the fuselage, which is capable of ensuring stability by reducing the collision load applied to the space, in which the occupant is present, by applying the support unit 300 and transferring and dispersing a crash load, which is applied to the fuselage, to the rear side of the wing unit 400 and the rear side of the fuselage.

Figure 7:
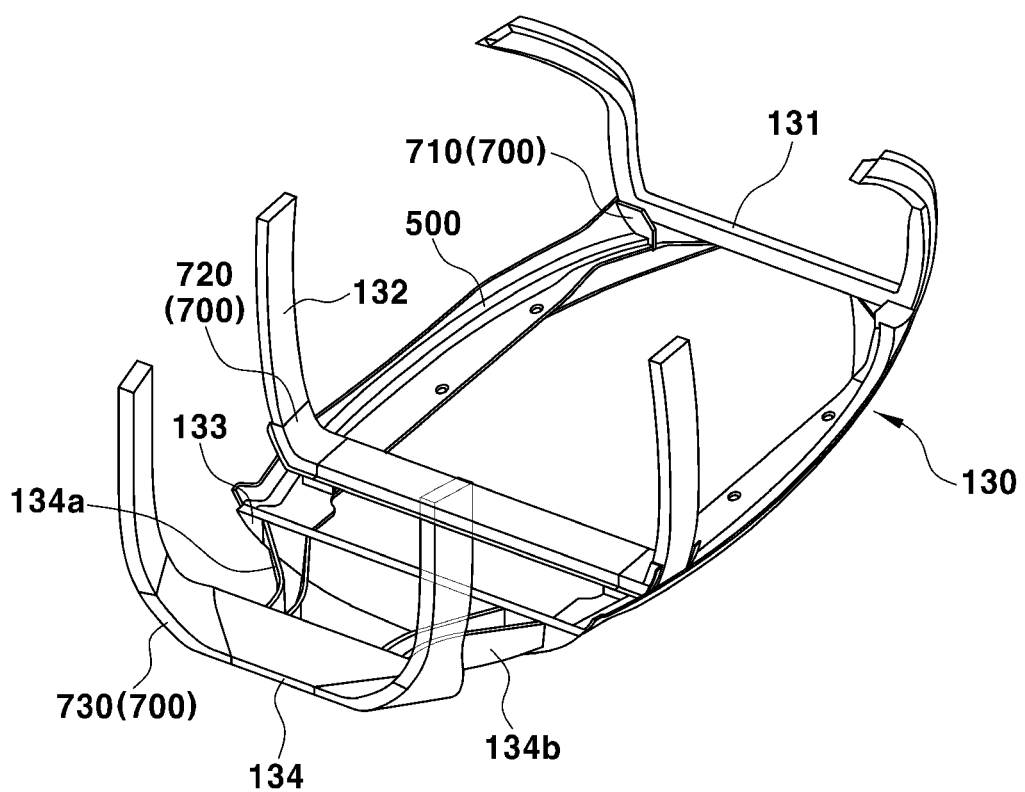
FIG. 7 is a view illustrating a battery load dispersion structure of a fuselage.
Figure 8:
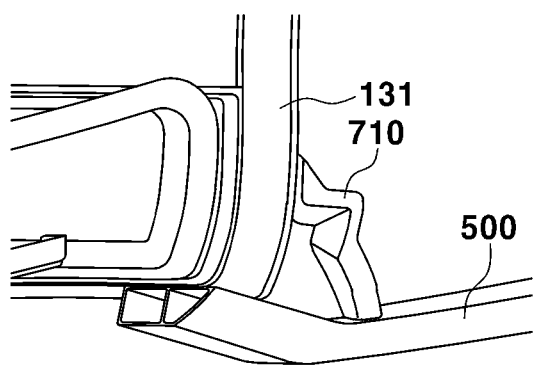
FIG. 8 is a view illustrating a front joint with respect to the battery load dispersion structure of the fuselage.

Hereinafter, FIG. 7 is a view illustrating a battery load dispersion structure of a fuselage, and FIG. 8 is a view illustrating a front joint with respect to the battery load dispersion structure of the fuselage.

Figure 9:
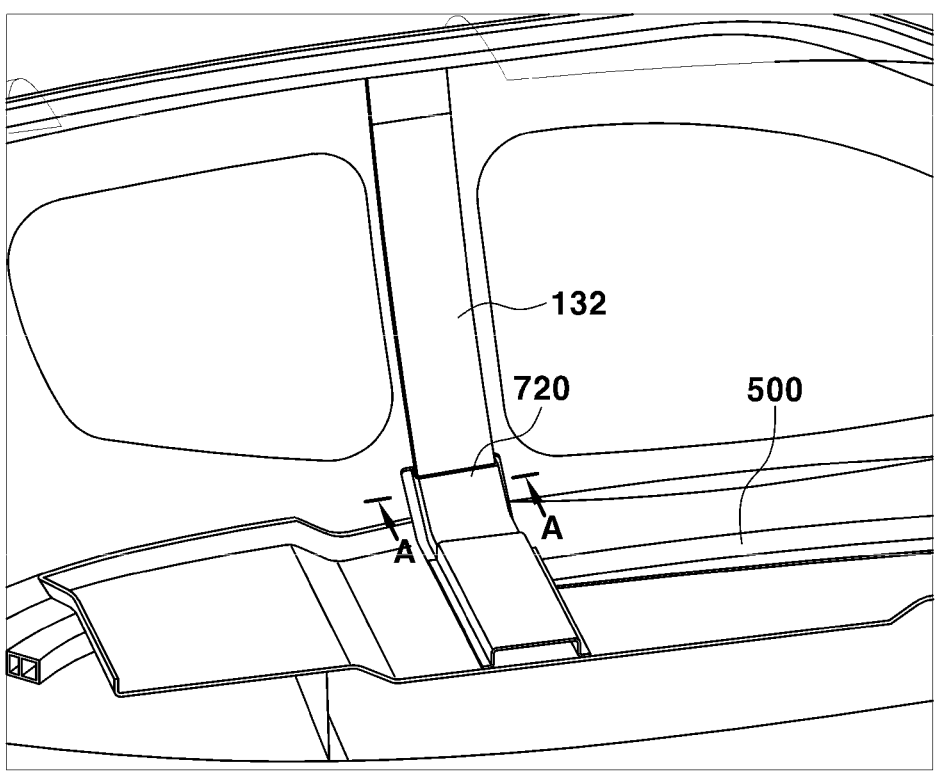
FIG. 9 is a view illustrating a first center joint with respect to the battery load dispersion structure of the fuselage.
Figure 10:
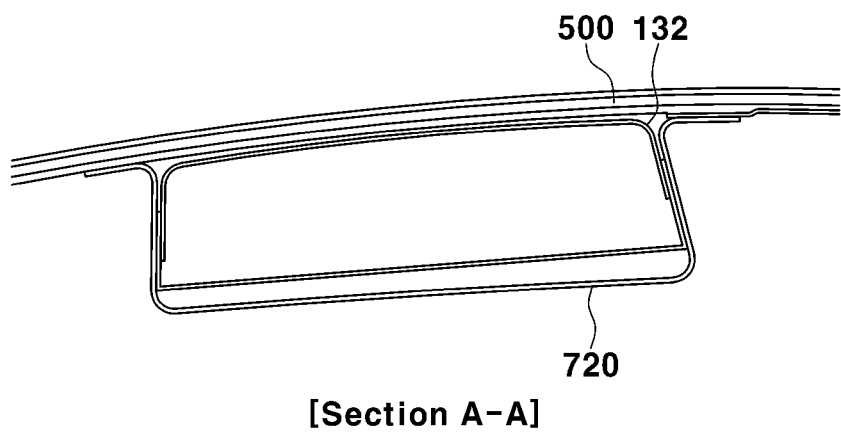
FIG. 10 is a cross-sectional view taken along line A-A in FIG. 9 and illustrating the battery load dispersion structure of the fuselage.

FIG. 9 is a view illustrating a first center joint with respect to the battery load dispersion structure of the fuselage, and FIG. 10 is a cross-sectional view taken along line A-A in FIG. 9 and illustrating the battery load dispersion structure of the fuselage.

Figure 11:
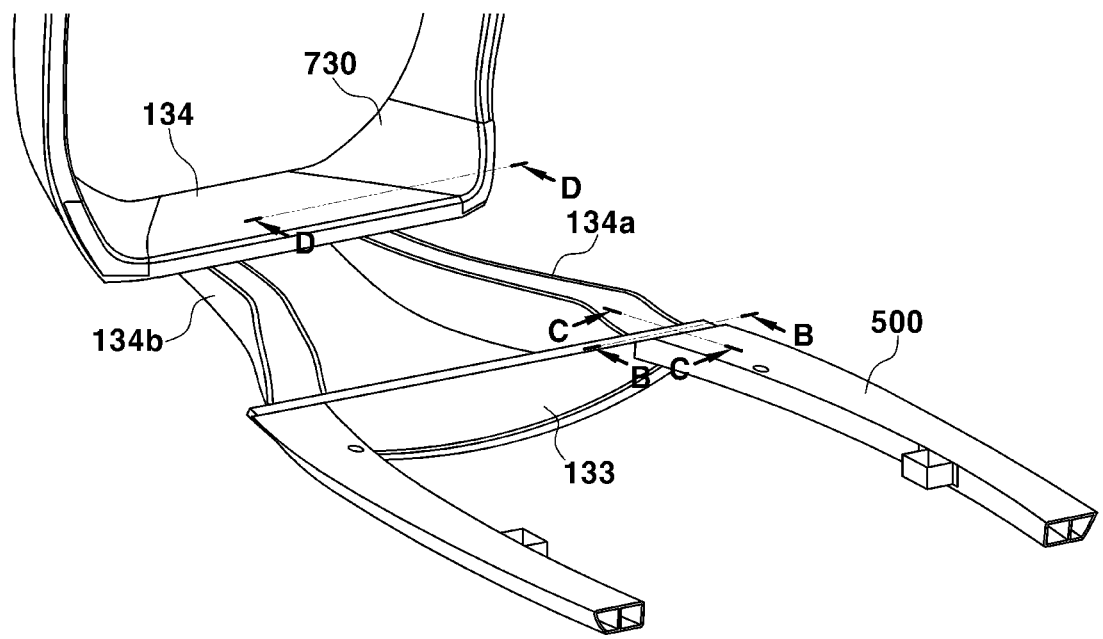
FIG. 11 is a view illustrating a second center joint and a rear joint with respect to the battery load dispersion structure of the fuselage.
Figure 12:
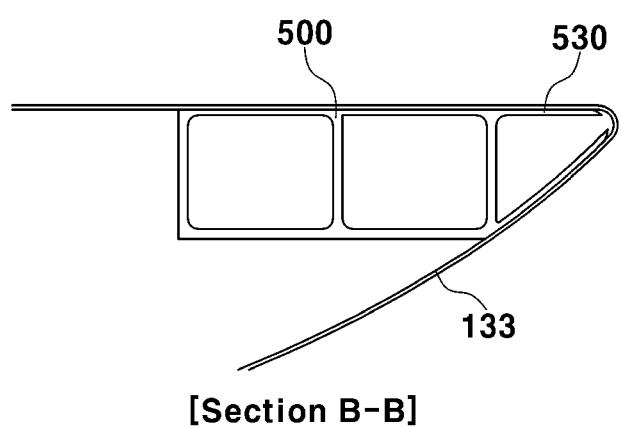
FIG. 12 is a cross-sectional view taken along line B-B in FIG. 11 and illustrating the battery load dispersion structure of the fuselage.

FIG. 11 is a view illustrating a second center joint and a rear joint with respect to the battery load dispersion structure of the fuselage, and FIG. 12 is a cross-sectional view taken along line B-B in FIG. 11 and illustrating the battery load dispersion structure of the fuselage.

Figure 13:
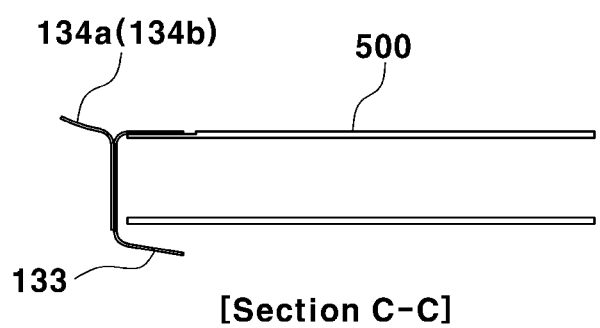
FIG. 13 is a cross-sectional view taken along line C-C in FIG. 11 and illustrating the battery load dispersion structure of the fuselage.
Figure 14:
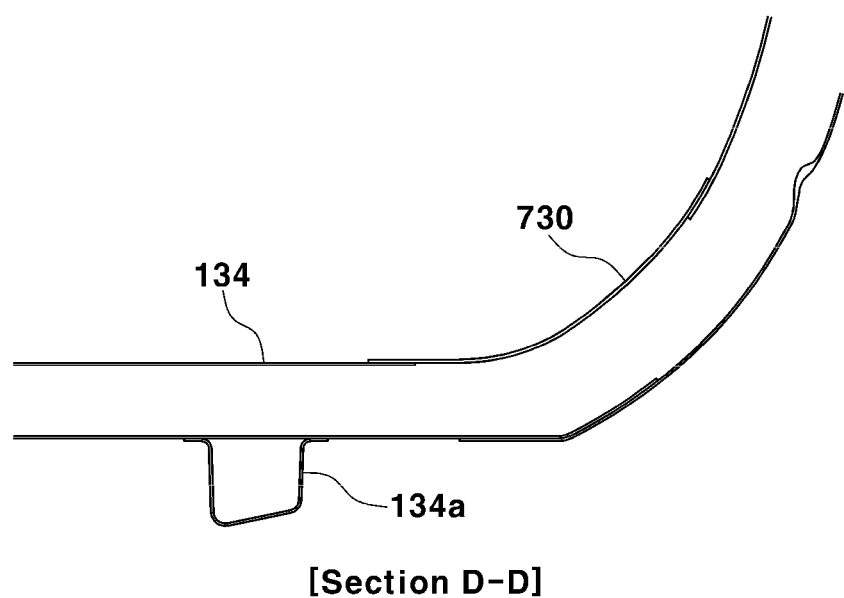
FIG. 14 is a cross-sectional view taken along line D-D in FIG. 11 and illustrating the battery load dispersion structure of the fuselage.
Figure 15A:
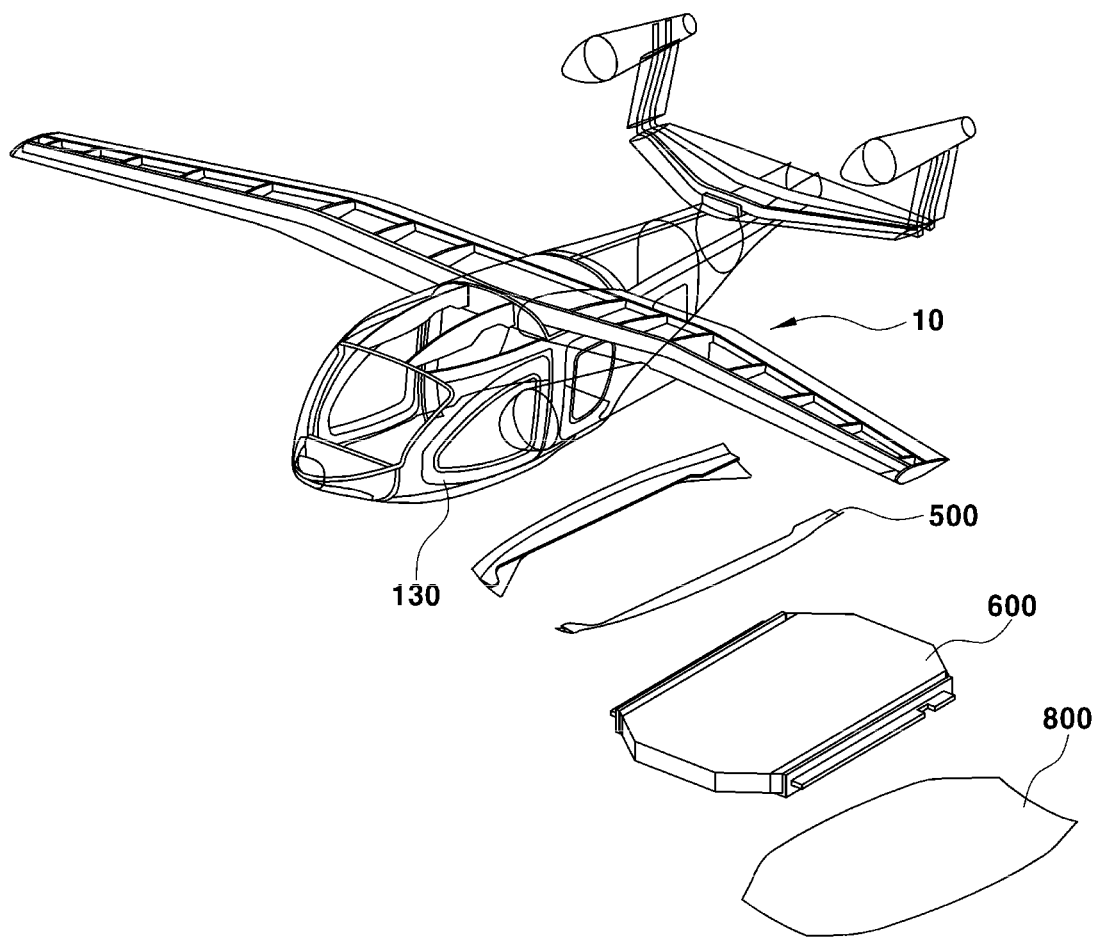

FIG. 13 is a cross-sectional view taken along line C-C in FIG. 11 and illustrating the battery load dispersion structure of the fuselage, FIG. 14 is a cross-sectional view taken along line D-D in FIG. 11 and illustrating the battery load dispersion structure of the fuselage, and FIGS. 15A and 15B are views illustrating a fastening member and a fuselage lower panel with respect to the battery load dispersion structure of the fuselage.

As illustrated in FIG. 7, the battery load support structure of the fuselage may include battery mount supports 500, a battery unit 600, and a joint unit 700.

The battery mount support 500 may be provided as a pair of battery mount supports 500 provided in the longitudinal direction of a floor frame 130 of a fuselage 10.

In at least some implementations, the floor frame 130 may define the fuselage floor. The interior space in the front unit 100 may be divided into the first-row passenger space at the front side and the second-row passenger space at the rear side.

The floor frame 130 may be divided into the first-row passenger space and the second-row passenger space based on the first center bulkhead 132 among the plurality of components that constitutes a framework member for structurally supporting the fuselage 10. A rear bulkhead 134 for supporting the second-row passenger space may include a pair of connection frames 134a and 134b connected to the second rear frame 220.

As illustrated in FIG. 15A, the battery unit 600 may be positioned on a rear surface of the floor frame 130, and two opposite sides of the battery unit 600 may be coupled to the pair of battery mount supports 500 mounted on the floor frame 130.

To this end, the battery unit 600 may include a battery 610 and a battery support 620.

The battery 610 may be provided to supply electric power for operating the fuselage 10. The battery support 620 may be coupled to two opposite sides of the battery 610 and coupled to the battery mount support 500, as illustrated in FIG. 15B.

The battery support 620 may include a first mounting member 622 and a second mounting member 624.

The first mounting member 622 may be coupled to surround the battery 610.

The second mounting member 624 may extend in a horizontal direction from the first mounting member 622 and may be coupled (see e.g., FIG. 15B) by a fastening member 510 and a nut 520 that penetrate the battery mount support 500, such that the battery 610 is fixed.

The fastening member 510 for fixing the battery 610 may penetrate the second mounting member 624. The fastening member 510, which penetrates the second mounting member 624 as described above, may be fastened to the nut 520 provided on the second mounting member 624, such that a position of the battery unit 600 may be fixed to the rear surface of the floor frame 130. Therefore, a fuselage lower panel 800 and a side panel 12 of the fuselage 10 may be coupled in a state in which the battery unit 600 is coupled to the battery mount support 500, thereby defining a bottom surface of the fuselage 10.

For example, a weight of the battery unit 600 may be about 800 kg (or any other weight), and the battery unit 600 may not be inputted into the interior by using a door opening portion of the fuselage 10 because of the size of the battery unit 600. Further, there may be a problem in that aerodynamic performance inevitably deteriorates because the battery unit 600 protrudes outward when the battery unit 600 is mounted on a lower portion of the fuselage 10.

Therefore, in the present disclosure (e.g., as illustrated in FIGS. 15A and 15B), the battery mount supports 500, which extend to have a length, may be mounted at the two opposite sides of the floor frame 130 that constitutes the fuselage 10. The battery unit 600 may be sequentially fastened to the battery mount supports 500, and the fuselage lower panel 800 may be coupled to extend from the side panel 12 of the fuselage 10 in a state in which the fastening is completed as described above, such that the bottom surface of the fuselage 10 is defined. Therefore, the battery unit 600 may be mounted on the lower portion of the fuselage 10 and disposed inside the fuselage lower panel 800, thereby solving a problem in that aerodynamic performance deteriorates because the battery unit 600 is installed to protrude.

It may be necessary to ensure performance for supporting the load as the weight of the battery unit 600 increases. Therefore, in the present disclosure, the configuration of the joint unit 700 may improve performance of the floor frame 130 that supports a load applied as the battery unit 600 is mounted.

In this case, the joint unit 700 may include a front joint 710, a first center joint 720, a second center joint, and a rear joint 730.

As illustrated in FIG. 8, the front joint 710 may be mounted at a position at which a front bulk head 131 and the battery mount support 500 face each other.

In an example, the front joint 710 may be formed such that a first coupling region and a second coupling region, which are provided in a perpendicular direction, support the front bulkhead 131 and the battery mount support 500.

The front joint 710 may define a skid mount bracket (see e.g., FIG. 5) for fastening a front skid member 135 mounted on a lower side of the floor frame 130 instead of simply serving to structurally support the front bulkhead 131 and the battery mount support 500.

As illustrated in FIG. 9, the first center joint 720 may be mounted on the first center bulkhead 132 for supporting the load transferred to the floor frame 130 and applied in the height direction of the fuselage.

As illustrated in FIG. 10, the first center joint 720 may be formed in a 'U' shape to accommodate the first center bulkhead 132 therein and coupled to the battery mount support 500, thereby defining the framework of the fuselage 10. As the first center bulkhead 132 and the battery mount support 500, which have closed cross-sections, are coupled, load supporting performance of the battery mount support 500 on which the battery unit 600 is mounted may be improved.

The second center joint corresponds to a second center bulkhead 133. The second center bulkhead 133 may define a joint structure for connecting the connection frames 134a and 134b for supporting the battery mount support 500 and the passenger space of the fuselage 10, thereby supporting the battery mount support 500.

The second center joint may be formed in a hemispherical shape corresponding to a shape of the lower portion of the fuselage 10. As illustrated in FIG. 13, the second center joint may be formed as the battery mount supports 500 and the connection frames 134a and 134b may be respectively flange-coupled to the front and rear surfaces.

In this case, the second center bulkhead 133, which defines the second center joint, may be formed in a hemispherical shape, such that the battery mount support 500, which is flange-coupled, may also be formed in a shape corresponding to the hemispherical shape. As illustrated in FIG. 12, the battery mount support 500 may have a coupling guide 530 corresponding to a coupling flange shape of the second center joint, and the battery mount support 500 may be effectively supported by the second center joint by using the coupling guide 530.

The rear joint 730 may be coupled to the rear bulkhead 134. As illustrated in FIG. 14, the rear joint 730 may connect the rear bulkhead 134 and the rear bulk header inner 134 extending to the first rear frame 220, thereby improving performance in supporting a structural load of the rear bulkhead 134 and improving performance in supporting the load of the connection frames 134a and 134b coupled to the rear bulkhead 134 and the load of the battery mount support 500 disposed on the same line as the connection frames 134 and 134b, thereby eventually supporting the battery unit 600 stably.

A battery load support structure of a fuselage may include: a battery mount support formed in a longitudinal direction of a floor frame of the fuselage; a battery unit inputted into an opened lower side of the floor frame and fastened to the battery mount support; and a joint unit configured to support the battery mount support and connected to a plurality of framework members that constitutes the floor frame.

The joint unit may include: a front joint mounted at a position at which the battery mount support faces a front bulkhead that constitutes the framework member; a first center joint mounted on the battery mount support and configured to accommodate therein a first center bulkhead that constitutes the framework member; a second center joint formed as a second center bulkhead, which constitutes the framework member, is connected to a connection frame that supports the battery mount support and a passenger space of the fuselage; and a rear joint coupled to a rear bulkhead that constitutes the framework member.

The front joint may be provided as a skid mounting bracket for fastening a front skid member mounted on the lower side of the floor frame.

The second center joint may be formed in a hemispherical shape corresponding to a shape of a lower portion of the fuselage and formed as the battery mount support and the connection frame are respectively flange-coupled to front and rear surfaces.

The battery mount support may have a coupling guide extending to correspond to a shape of a coupling flange of the second center joint.

The battery unit may include: a battery configured to supply electric power for operating the fuselage; and a battery support extending to two opposite sides of the battery and coupled to the battery mount support.

The battery support may be fixed to the battery from the floor frame by a fastening member and a nut that penetrate the battery mount support.

The battery load support structure may further include: a fuselage lower panel configured to define a bottom surface of the fuselage by being coupled to a side panel of the fuselage in a state in which the battery unit is coupled to the battery mount support.

According to the present disclosure, the battery mount support may be mounted on the floor frame, and the battery unit may be fastened to the battery mount support extending in the longitudinal direction, such that the battery unit may be coupled from below the fuselage. Further, the joint unit is coupled to the plurality of positions at which the battery mount support adjoins the front bulkhead, the center bulkhead, and the rear bulkhead that constitute the fuselage, such that structural reinforcement is implemented. Therefore, it is possible to improve load supporting performance of the battery mount support.

According to one or more aspects of the present disclosure, the battery mount support may be mounted on the floor frame, and the battery unit may be fastened to the battery mount support extending in the longitudinal direction, such that the battery unit may be coupled from below the fuselage. Further, the joint unit may be coupled to the plurality of positions at which the battery mount support adjoins the front bulkhead, the center bulkhead, and the rear bulkhead that constitute the fuselage, such that structural reinforcement is implemented. Therefore, it is possible to improve load supporting performance of the battery mount support.

While various examples of the present disclosure have been described above with reference to the illustrated drawings, the exemplary aspects of the present disclosure are described just for illustration, and those skilled in the art will understand that various modifications of the features may be made, and all or some of the described features may be selectively combined. Accordingly, the true technical protection scope of the present disclosure should be determined by the technical spirit of the appended claims.

What is claimed is:

1. A structure, comprising:
   a battery mount support coupled to a floor frame of a fuselage;
   a battery unit inputted into an opened lower side of the floor frame and fastened to the battery mount support; and
   a joint unit configured to support the battery mount support and connected to a plurality of framework members that constitutes the floor frame,
   wherein the joint unit comprises:
      a front joint mounted at a position at which the battery mount support faces a front bulkhead that constitutes at least one of the plurality of framework members;
      a first center joint mounted on the battery mount support and configured to accommodate therein a first center bulkhead that constitutes at least one of the plurality of framework members;
      a second center joint formed as a second center bulkhead that constitutes at least one of the plurality of framework members, wherein the second center bulkhead is connected to a connection frame, and wherein the connection frame is configured to support the battery mount support and a passenger space of the fuselage; and
      a rear joint coupled to a rear bulkhead that constitutes at least one of the plurality of framework members,
   wherein the front joint is provided as a skid mounting bracket for fastening a front skid member mounted on the opened lower side of the floor frame, and
   wherein the battery mount support has a coupling guide extending to correspond to a shape of a coupling flange of the second center joint.

2. The structure according to claim 1, wherein the second center joint is formed in a hemispherical shape corresponding to a shape of a lower portion of the fuselage and the connection frame is flange-coupled to the second center bulkhead.

3. The structure according to claim 1, wherein the battery unit comprises:
   a battery configured to supply electric power for operating the fuselage; and
   a battery support configured to support two opposite sides of the battery, wherein the battery support is coupled to the battery mount support.

4. The structure according to claim 3, wherein the battery support is fixed to the battery and to the battery mount support by a nut and a bolt, and wherein the bolt penetrates the battery mount support and the battery support.

5. The structure according to claim 1, further comprising:
   a fuselage lower panel configured to constitute a bottom surface of the fuselage by being coupled to a side panel of the fuselage in a state in which the battery unit is coupled to the battery mount support.

6. A vehicle, comprising:
   a body;
   a battery mount support coupled to a floor frame of the body;
   a battery unit inputted into an opened lower side of the floor frame and fastened to the battery mount support; and
   a joint unit configured to support the battery mount support and connected to a plurality of framework members that constitutes the floor frame, wherein the joint unit comprises:
      a front joint mounted at a position at which the battery mount support faces a front bulkhead that constitutes at least one of the plurality of framework members; and
      a rear joint coupled to a rear bulkhead that constitutes at least one of the plurality of framework members,
   wherein the front joint is provided as a skid mounting bracket for fastening a front skid member mounted on the opened lower side of the floor frame, and
   wherein the battery mount support has a coupling guide extending to correspond to a shape of a coupling flange of a center joint of the joint unit.

7. The vehicle according to claim 6, wherein the joint unit further comprises:
   a first center joint mounted on the battery mount support and configured to accommodate therein a first center bulkhead that constitutes at least one of the plurality of framework members; and
   the center joint of the joint unit, wherein the center joint of the joint unit is a second center joint formed as a second center bulkhead that constitutes at least one of the plurality of framework members, wherein the second center bulkhead is connected to a connection frame, and wherein the connection frame is configured to support the battery mount support and a passenger space of the body.

8. The vehicle according to claim 7, wherein the second center joint is formed in a hemispherical shape corresponding to a shape of a lower portion of the body and the connection frame is flange-coupled to the second center bulkhead.

9. The vehicle according to claim 6, wherein the battery unit comprises:
  a battery configured to supply electric power for operating the body; and
  a battery support configured to support two opposite sides of the battery, wherein the battery support is coupled to the battery mount support.

10. The vehicle according to claim 9, wherein the battery support is fixed to the battery and to the battery mount support by a nut and a bolt, and wherein the bolt penetrates the battery mount support and the battery support.

11. The vehicle according to claim 6, further comprising:
  a lower panel configured to constitute a bottom surface of the body by being coupled to a side panel of the body in a state in which the battery unit is coupled to the battery mount support.

\* \* \* \* \*